UNITED STATES PATENT OFFICE.

EUGENE VON VARGYAS, OF PITTSBURGH, PENNSYLVANIA.

RUBBER COMPOUND.

1,061,207.     Specification of Letters Patent.     Patented May 6, 1913.

No Drawing.     Application filed August 9, 1912. Serial No. 714,213.

*To all whom it may concern:*

Be it known that I, EUGENE VON VARGYAS, a subject of the King of Hungary, residing at Pittsburgh, in the county of Allegheny, and State of Pennsylvania, have invented certain new and useful Improvements in Rubber Compound, of which the following is a specification.

This invention relates to a new article of manufacture, a rubber compound, and has for its object to provide a compound formed from composition substantially as herein set forth which is adapted to be used for the majority of purposes for which rubber is intended, but more particularly for the outer tubes of pneumatic tires.

A further object of the invention is to provide a rubber compound which not only possesses requisite resiliency but also a non-slipping or non-skidding quality, which makes the composition peculiarly applicable for the outer shoes of pneumatic tires.

In making my improved compound I prefer to use 1 lb. rubber in its uncured state, $1\frac{7}{10}$ to $3\frac{3}{4}$ ounces of dry cork in granulated form, and approximately $1\frac{1}{10}$ ounces of coal ash in granulated form. The compound which secures the best results for tires and the like is the one wherein the weight of cork is the lower one above stated; that is, $1\frac{7}{10}$ ounces.

The rubber is reduced to the proper consistency in any suitable manner as by the use of a solvent, after which the dry cork and coal ash are added and thoroughly mixed with the rubber. The composition is then placed in a mold of the desired shape and may be vulcanized in the ordinary manner. By coal ash is meant the ash which results from the burning of coal or of coke, which latter is of course coal with the volatile products removed. Both the cork and the coal ash are reduced to a very fine flour, although the degree of granulation may vary between certain limits.

The cork flour constitutes a filler and the coal ash in granulated form constitutes a binder for the rubber and cork.

The compound set forth provides a cheap and durable substitute for rubber, and possesses in a high degree the non-slipping or non-skidding characteristics to which I have referred. It is on account of such characteristics that the compound can be advantageously employed for use for the outer shoes of pneumatic tires. The use of the cork combined as described increases not only the lightness but also the wearing and non-slipping qualities.

What I claim as new and desire to secure by Letters Patent is the following:

1. As a new article of manufacture a rubber compound consisting of a vulcanized composition of rubber, granulated cork and granulated coal ash, the quantity of rubber in the compound by weight being greater than the combined weights of the cork and coal ash.

2. As a new article of manufacture a rubber compound consisting of a vulcanized composition of approximately one pound of rubber, from one and seven-tenths to three and and three-tenths ounces of dry cork in granulated form and about one and one-tenth ounces of coal ash in granulated form.

3. As a new article of manufacture a rubber compound consisting of a vulcanized composition of approximately one pound of rubber, one and seven-tenths ounces of dry cork in granulated form, and one and one-tenth ounces of coal ash in granulated form.

4. As a new article of manufacture a rubber compound consisting of a vulcanized composition of rubber, granulated cork and granulated coal ash, the quantity of rubber in the compound by weight being greater than the combined weights of the cork and the coal ash and the weight of the cork being greater than that of the coal ash.

In testimony whereof I have hereunto signed my name in the presence of the two subscribed witnesses.

EUGENE VON VARGYAS.

Witnesses:
    LETITIA A. MYERS,
    ARCHWORTH MARTIN.